(12) United States Patent
Fukui et al.

(10) Patent No.: US 12,442,962 B2
(45) Date of Patent: Oct. 14, 2025

(54) OPTICAL MULTIPLEXER

(71) Applicant: Panasonic Intellectual Property Management Co., Ltd., Osaka (JP)

(72) Inventors: Atsushi Fukui, Osaka (JP); Kazumasa Takata, Osaka (JP); Yosuke Araki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 308 days.

(21) Appl. No.: 18/458,185

(22) Filed: Aug. 30, 2023

(65) Prior Publication Data

US 2023/0400613 A1 Dec. 14, 2023

Related U.S. Application Data

(63) Continuation of application No. PCT/JP2022/008124, filed on Feb. 28, 2022.

(30) Foreign Application Priority Data

Mar. 17, 2021 (JP) .................. 2021-043475

(51) Int. Cl.
*G02B 5/18* (2006.01)
*H04J 14/02* (2006.01)

(52) U.S. Cl.
CPC ........ *G02B 5/1866* (2013.01); *H04J 14/0307* (2023.08)

(58) Field of Classification Search
None
See application file for complete search history.

(56) References Cited

U.S. PATENT DOCUMENTS

2009/0267088 A1 10/2009 Peng et al.
2010/0259729 A1 10/2010 Iyoda et al.
(Continued)

FOREIGN PATENT DOCUMENTS

JP 2010-243987 10/2010
JP 2015-195232 11/2015
(Continued)

OTHER PUBLICATIONS

International Search Report of PCT application No. PCT/JP2022/008124 dated May 10, 2022.

*Primary Examiner* — Nicholas J Lee
(74) *Attorney, Agent, or Firm* — Wenderoth, Lind & Ponack, L.L.P.

(57) ABSTRACT

An optical multiplexer includes a plurality of light sources that emit a plurality of laser beams having different wavelengths, a collimator that collimates a plurality of laser beams emitted from a plurality of light sources, and a diffraction grating that diffracts a plurality of laser beams collimated by the collimator and emits a plurality of laser beams along a same optical path, the diffraction grating being of a transmission-type. A plurality of light sources are linearly arranged on an incident side focal plane of the collimator, a grating surface of the diffraction grating is disposed on an emission side focal plane of the collimator, and distance D between two adjacent light sources is set to satisfy $D=f\times(\lambda_1-\lambda_2)/p$, where $\lambda_1, \lambda_2$ ($\lambda_1>\lambda_2$) are respectively wavelengths of laser beams emitted from the two adjacent light sources.

7 Claims, 10 Drawing Sheets

(56) References Cited

U.S. PATENT DOCUMENTS

2018/0306952 A1 10/2018 Marutani
2019/0020178 A1 1/2019 Oguri et al.
2021/0387282 A1 12/2021 Ichihashi

FOREIGN PATENT DOCUMENTS

| JP | 2018-185403 | 11/2018 |
| WO | 2017/134911 | 8/2017 |
| WO | 2020/116078 | 6/2020 |
| WO | 2020/174752 | 9/2020 |

# OPTICAL MULTIPLEXER

TECHNICAL FIELD

The present disclosure relates to an optical multiplexer that multiplexes a plurality of laser beams having different wavelengths.

BACKGROUND ART

PTL 1 discloses as an optical multiplexer an optical multiplexer using a diffraction grating. In the optical multiplexer disclosed in PTL 1 as illustrated in FIG. 21, diffraction grating 100 and collimator lenses 110, 120, 130 are integrally formed. Laser beams L1, L2, L3 having different wavelengths are collimated respectively by collimator lenses 110, 120, 130, and are diffracted and reflected by diffraction grating 100. The incident angles of laser beams L1, L2, L3 with respect to diffraction grating 100 are set such that laser beams L1, L2, L3 are incident on diffraction grating 100 at the same place, and reflected laser beams of laser beams L1, L2, L3 are along the same optical path L4.

CITATION LIST

Patent Literature

PTL 1: Unexamined Japanese Patent Publication No. 2010-243987

SUMMARY OF THE INVENTION

An optical multiplexer according to one aspect of the present disclosure is an optical multiplexer that multiplexes a plurality of laser beams having wavelengths different from each other and emits a multiplexed laser light, the optical multiplexer including a plurality of light sources that emit laser beams having a plurality of different wavelengths, a collimator that collimates a plurality of laser beams emitted from a plurality of light sources, and a diffraction grating that diffracts a plurality of laser beams collimated by the collimator and emits a plurality of laser beams along the same optical path, the diffraction grating being of a transmission-type, where a plurality of light sources are linearly arranged on an incident side focal plane of the collimator, a grating surface of the diffraction grating is disposed on an emission side focal plane of the collimator, a direction along which the plurality of light sources are arranged and a direction along which grooves of the diffraction grating extend are orthogonal to each other, and distance D between two adjacent light sources among a plurality of light sources is set to satisfy $D=f\times(\lambda_1-\lambda_2)/p$, where $\lambda_1$, $\lambda_2$ ($\lambda_1>\lambda_2$) are respectively wavelengths of laser beams emitted from the two adjacent light sources, f is a focal length of the collimator, and p is a pitch of the diffraction grating.

DESCRIPTION OF EMBODIMENT

In an optical multiplexer disclosed in PTL 1, increasing a diffraction angle of a diffraction grating to dispose light sources of laser beams having different wavelengths in a spaced arrangement significantly decreases the diffraction efficiency of the diffraction grating. This is because, while a light beam of a particular wavelength can be optimized to have a high diffraction efficiency, laser beams other than the optimized light having the particular wavelength will have low diffraction efficiencies.

Meanwhile, reducing the diffraction angle of the diffraction grating will increase diffraction efficiency but results in diffraction angles of laser beams having different wavelengths being close to each other. In this case, to separate the light sources of laser beams having different wavelengths from each other, the optical path length from each of the light sources to the diffraction grating needs to be increased. Thus, each of the light sources of laser beams having different wavelengths needs to be disposed considerably far from the diffraction grating, and this disadvantageously increases the size of an optical system including light sources.

Moreover, disposing a collimator lens for each light source disadvantageously causes color shift of multiplexed light due to positional error of the light source with respect to the collimator lens.

The present disclosure has been made in view of such issues. A main object of the present disclosure is to provide an optical multiplexer having a high diffraction efficiency with small color shift, and with which an optical system including a light source can be downsized.

Hereinafter, an exemplary embodiment of the present disclosure will be described in detail with reference to the drawings. Note that, the present disclosure is not limited to the following exemplary embodiments. Furthermore, modifications can be made as appropriate without departing from the scope within which an effect of the present disclosure is exhibited.

First Exemplary Embodiment

Figure 1:
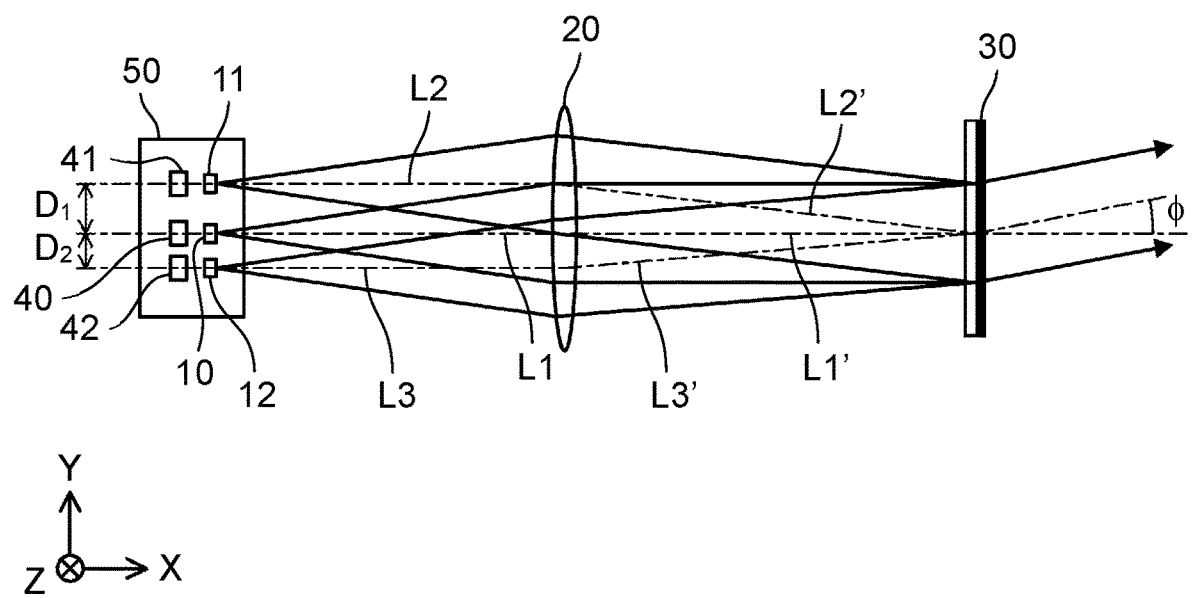
FIG. 1 is a view schematically illustrating a configuration of an optical multiplexer according to a first exemplary embodiment of the present disclosure.
Figure 2:
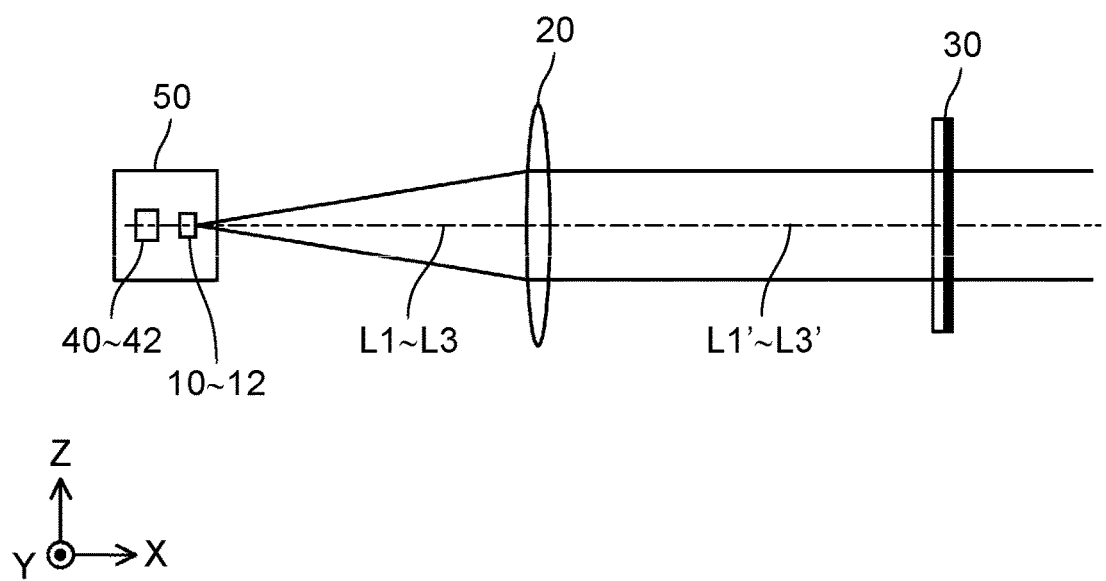
FIG. 2 is a view schematically illustrating the configuration of the optical multiplexer according to the first exemplary embodiment of the present disclosure.

FIGS. 1 and 2 are views schematically illustrating a configuration of an optical multiplexer according to a first exemplary embodiment of the present disclosure. The left-right direction in a plane of drawing is X axis, the vertical direction in a plane of drawing is Y axis, and the depth direction in a plane of drawing is Z axis. FIG. 1 is a view of the optical multiplexer as viewed from the Z axis direction, and FIG. 2 is a view of the optical multiplexer as viewed from the Y axis direction.

As illustrated in FIGS. 1 and 2, the optical multiplexer according to the present exemplary embodiment includes a plurality of light sources 10, 11, 12 that emit laser beams having different wavelengths, collimator lens (collimator) 20 that collimates laser beams L1, L2, L3 emitted from light sources 10, 11, 12, and transmissive diffraction grating 30 that diffracts laser beams L1', L2', L3' collimated by collimator lens 20 and emits diffracted beams along the same optical path.

For example, each of light sources 10, 11, 12 is a light source of a semiconductor laser, includes a small light emission point that can be regarded as a point light source, and emits an elliptically spreading light in forward direction (to the positive side of the X axis) and in rearward direction (to the negative side of the X axis).

Light sources 10, 11, 12 are linearly arranged on an incident side focal plane of collimator lens 20. Light sources 10, 11, 12 are disposed such that the minor axis direction (fast axis direction) of the ellipse of the laser light is along the Z axis direction, and the major axis direction (slow axis direction) of the ellipse of the laser light is along the Y axis direction (first direction).

For example, light sources 10, 11, 12 emit laser beams L1, L2, L3 indicating three primary colors of light (green, red, blue). Light sources 10, 11, 12 are linearly arranged along the Y axis toward the positive side in the order of wavelength of emitted laser beams (blue, green, red).

Light receivers 40, 41, 42 that receive laser beams emitted from light sources 10, 11, 12 are disposed behind (on the negative side regarding the X axis of) light sources 10, 11, 12 at places corresponding to where light sources 10, 11, 12 are disposed. Outputs of light receivers 40, 41, 42 are used by a control circuit (not illustrated) to stabilize light outputs of light sources 10, 11, 12. Light sources 10, 11, 12 and light receivers 40, 41, 42 constitute a light receiving and emitting unit.

Collimator lens 20 is a rotationally symmetric lens in which chromatic aberration is corrected, and includes, for example, a lens of laminated materials having different refractive indexes.

Figure 3:
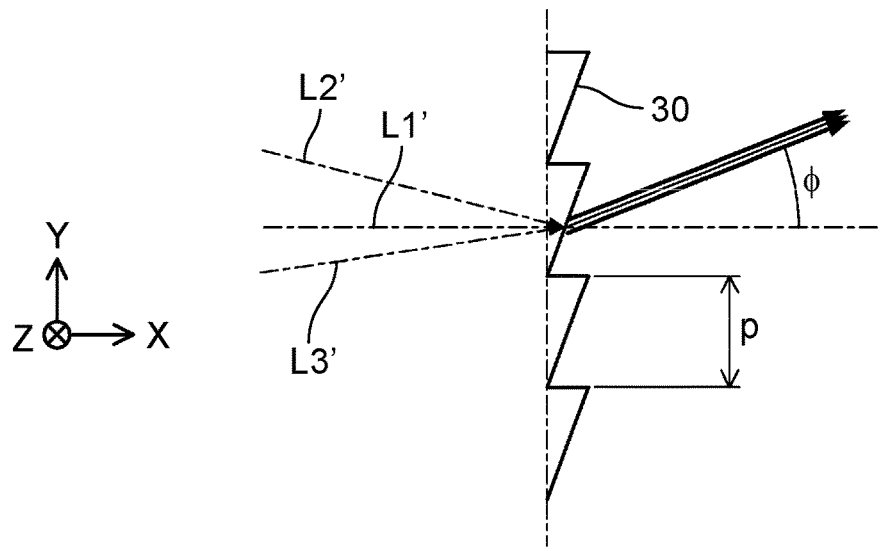
FIG. 3 is an enlarged view of a diffraction grating.

For example, as illustrated in FIG. 3, diffraction grating 30 includes a blaze-type diffraction grating having sawtooth-shaped grating grooves formed in parallel with the Z axis at pitch p. A grating surface of diffraction grating 30 is disposed on an emission side focal plane of collimator lens 20. The direction (Y axis direction) along which light sources 10, 11, 12 are arranged and the direction (Z axis direction) along which grooves of diffraction grating 30 extend are orthogonal to each other.

Laser light L1 emitted from green light source 10 is collimated by collimator lens enters diffraction grating 30 as parallel light L1' parallel to the X axis, and is emitted in a 1st-order diffraction direction. When $\lambda g$ is a green wavelength and $\phi$ is the direction of emission from diffraction grating 30, the formula $\sin(\phi)=\lambda g/p$ is satisfied.

As illustrated in FIG. 1, light sources 10, 11, 12 are disposed on the incident side focal plane of collimator lens 20, so that laser beams are emitted as parallel laser beams from collimator lens 20. Since light source 10 is disposed on the X axis, laser light L1' collimated by collimator lens 20 is a parallel light parallel to the X axis. When $D_1$ is the distance between light source 10 and light source 11 and f is a focal length of collimator lens 20, laser light L2' resulting from collimator lens 20 collimating laser light L2 emitted from light source 11 is a parallel light directed at an angle $\operatorname{atan}(D_1/f)$ with respect to the X axis. When $D_2$ is the distance between light source 10 and light source 12, laser light L3' resulting from collimator lens 20 collimating laser light L3 emitted from light source 12 is a parallel light directed at an angle $\operatorname{atan}(D_2/f)$ with respect to the X axis. The "atan" is the arctangent function.

Since the grating surface of diffraction grating 30 is disposed on the emission side focal plane of collimator lens 20, laser beams L1', L2', L3' collimated by collimator lens 20 gather at the same place on diffraction grating 30 as illustrated in FIG. 3.

When $\alpha$ is an incident angle on a diffraction grating, $\beta$ is an angle of emission from diffraction grating, $\lambda$ is a wavelength of light, and p is a grating pitch of the diffraction grating, 1st-order diffracted light is expressed by the formula $-\sin(\alpha)+\sin(\beta)=\lambda/p$. When $\alpha$ and $\beta$ are small, the formula can be approximated to be $-\alpha+\beta=\lambda/p$ (Formula 1).

When $\lambda g$ is the wavelength of laser light L1 emitted from light source 10, emission angle $\beta g$ is expressed by $\beta g=\phi=\lambda g/p$ (Formula 2) since incident angle $\alpha g$ of laser light L1' is 0.

When $\lambda r$ is the wavelength of laser light L2 emitted from light source 11, incident angle $\alpha r$ of laser light L2' is given by $-\operatorname{atan}(D_1/f)$, and approximated to be $\alpha_r=-D_1/f$ when $D_1 \ll f$. Thus, from Formula 1, emission angle $\beta r$ is expressed by $\beta r=\lambda r/p-D_1/f$ (Formula 3).

When emission angle $\beta g$ of laser light L1' and emission angle $\beta r$ of laser light L2' are the same, $\lambda g/p=\lambda r/p-D_1/f$ is given from Formula 2 and Formula 3. Thus, when distance $D_1$ between light source 10 and light source 11 is set to $D_1=f\times(\lambda r-\lambda g)/p$ (Formula 4), 1st-order diffracted laser beams that are of laser beams L1, L2 emitted from light source 10 and light source 11 are emitted from diffraction grating 30 at the same emission angle.

Similarly, when λb is the wavelength of laser light L3 emitted from light source 13, incident angle αb of laser light L3' is given by atan($D_2$/f), and approximated to be αb=$D_2$/f when $D_2$<<f. Thus, from Formula 1, emission angle βb is expressed by βb=λb/p+$D_2$/f (Formula 5).

When emission angle βg of laser light L1' and emission angle βb of laser light L3' are the same, λg/p=λb/p+$D_2$/f is given from Formula 2 and Formula 5. Thus, when distance $D_2$ between light source 10 and light source 12 is set to $D_2$=f×(λg−λb)/p (Formula 6), 1st-order diffracted laser beams that are of laser beams L1, L3 emitted from light source 10 and light source 12 are emitted from diffraction grating 30 at the same emission angle.

As described above, by setting distance $D_1$ between light source 10 and light source 11 and distance $D_2$ between light source 10 and light source 12 to values obtained by Formula 4 and Formula 6, the 1st-order diffracted laser beams that are of laser beams L1, L2, L3 emitted from light sources 10, 11, 12 are emitted from diffraction grating 30 along the same optical path. Thus, when laser beams L1, L2, L3 emitted from light sources 11, 12 are three primary colors of light (green, red, blue), diffraction grating 30 multiplexes laser beams L1, L2, L3 and emits white light.

According to the present exemplary embodiment, the laser beams from light sources 10, 11, 12 are all collimated by collimator lens 20, so that even when decentering, that is, a shift of collimator lens 20 in the Y axis direction with respect to light sources 10, 11, 12 occurs, the azimuths of the laser beams from light sources 10, 11, 12 change by the same amount, so that color shift is not likely to occur in the light multiplexed by diffraction grating 30. Similarly, even when defocusing by collimator lens 20, that is, a shift of collimator lens 20 in the X axis direction occurs, the beams from light sources 10, 11, 12 all expand by defocusing by the same amount, so that color shift is not likely to occur in the light multiplexed by diffraction grating 30.

Since the length of the optical multiplexer is substantially the sum of the incident side focal length and the emission side focal length of collimator lens 20, the optical multiplexer can be downsized by shortening the focal length. In general, for a shorter focal length of collimator lens 20, the change in beam caused by decentering of collimator lens with respect to light sources 10, 11, 12 and defocusing by collimator lens 20 is larger. Disposing collimator lens 20 for each light source may cause a large color shift. In contrast, using a single collimator lens 20 for the three light sources reduces color shift and allows shortening a focal length, and this makes it easy to downsize the optical multiplexer.

1st-order average diffraction efficiency of light multiplexing using the diffraction grating is obtained by simulation as follows. When the wavelengths of laser beams from light sources L1, L2, L3 are respectively λg=532 nm, λr=635 nm, and λb=467 nm, the 1st-order average diffraction efficiency is 67% when pitch p of diffraction grating 30 is 2.0 μm, 81% when pitch p is 3.9 μm, and 86% when pitch p is 7.8 μm. This shows that the diffraction efficiency is smaller for smaller pitch p. Thus, pitch p of diffraction grating 30 is desirably 4 μm or more to obtain a diffraction efficiency of 80% or more.

Three light sources 10, 11, 12 are exemplified in the present exemplary embodiment, but the present invention is not limited to this configuration. Two light sources or four or more light sources may be used. In this case, distance D between two adjacent light sources among a plurality of light sources is set to satisfy the formula D=f×($\lambda_1$−$\lambda_2$)/p, where $\lambda_1$, $\lambda_2$ ($\lambda_1$>$\lambda_2$) are wavelengths of laser beams emitted from the light sources, f is a focal length of collimator lens 20, and p is a pitch of diffraction grating 30.

When three light sources 10, 11, 12 are of three primary colors of light (green, red, blue), the wavelength of a semiconductor laser may be set to a range of 610 nm to 660 nm for red, a range of 510 nm to 550 nm for green, and a range of 440 nm to 480 nm for blue. When the number of light sources is four or more, a combination of visible light and near-infrared light or a combination of visible light and near-ultraviolet light may be used.

Collimator lens 20 is a laminated lens in the present exemplary embodiment, but a plurality of lenses may be used in combination. A single lens having a plano-convex shape or a biconvex shape that has an increased chromatic aberration but within an acceptable range may be used.

First Modification of First Exemplary Embodiment

Figure 4:
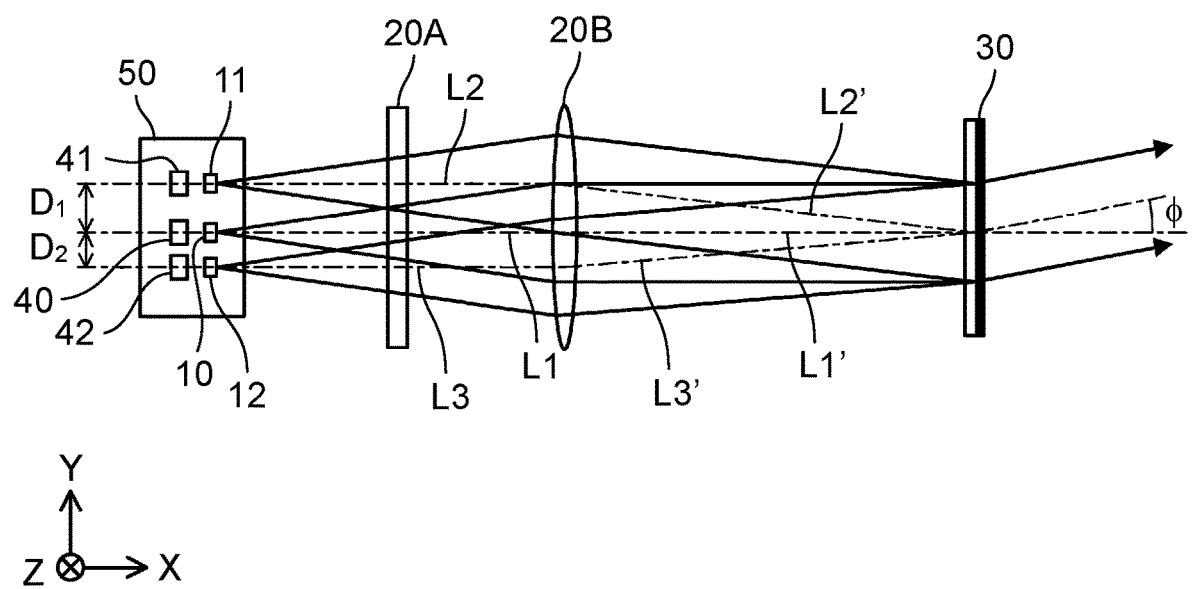
FIG. 4 is a view schematically illustrating a configuration of an optical multiplexer according to a modification of the first exemplary embodiment.
Figure 5:
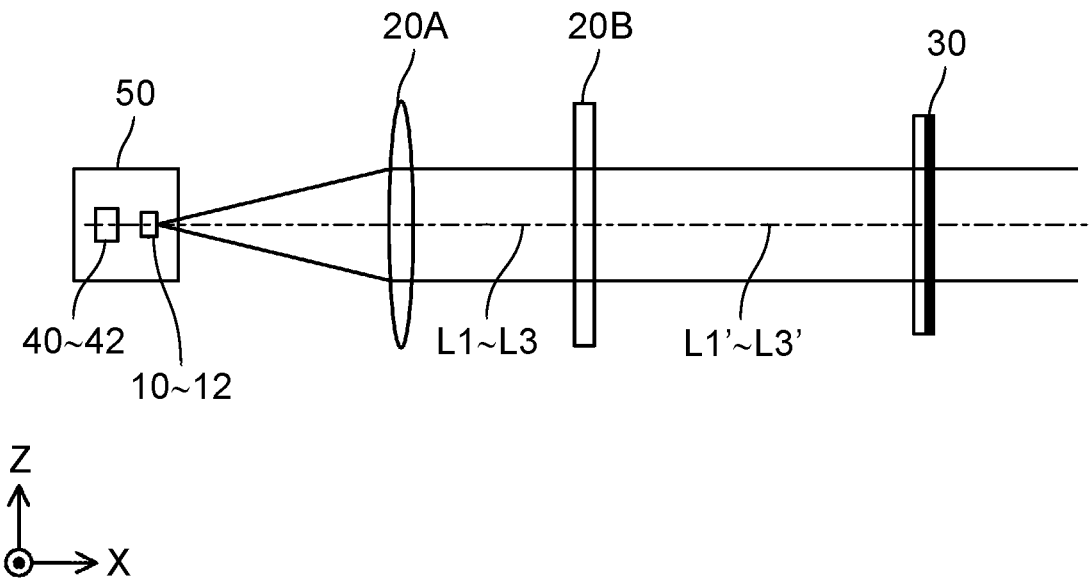
FIG. 5 is a view schematically illustrating the configuration of the optical multiplexer according to the modification of the first exemplary embodiment.

FIGS. 4 and 5 are views schematically illustrating a configuration of an optical multiplexer according to a modification of the first exemplary embodiment. FIG. 4 is a view of the optical multiplexer as viewed from the Z axis direction, and FIG. 5 is a view of the optical multiplexer as viewed from the Y axis direction. In FIGS. 4 and 5, the same component as that in FIGS. 1 and 2 is denoted by the same reference mark, and description thereof will be omitted.

The present modification is different from the first exemplary embodiment in that collimator lens 20 is divided into a lens for fast axis direction and a lens for slow axis direction to collimate an emitted light from a light source.

As illustrated in FIGS. 4 and 5, the collimator lens includes first collimator lens and second collimator lens 20B. Each of laser beams emitted from light sources 10, 11, 12 includes a fast axis component and a slow axis component. First collimator lens collimates the fast axis component of each laser beam. Second collimator lens 20B collimates the slow axis component of each laser light.

First collimator lens 20A is, for example, a lens having an aspherical cylindrical shape having a cylindrical axis in the Y axis direction. Second collimator lens 20B is a lens having an aspherical cylindrical shape having a cylindrical axis in the Z axis direction. To collimate laser beams having a plurality of wavelengths, first collimator lens 20A and second collimator lens 20B are each desirably a lens in which chromatic aberration are corrected, for example, a laminated lens including materials having different refractive indexes.

In the present modification, light sources 10, 11, 12 are disposed on an incident side focal plane of first collimator lens 20A and second collimator lens 20B, and a grating surface of diffraction grating 30 is disposed on an emission side focal plane of second collimator lens 20B.

Note that, the arrangement of light sources 10, 11, 12 and how laser beams emitted from light sources 10, 11, 12 and collimated by first and second collimator lenses 20B are diffracted by diffraction grating 30 and emitted along the same optical path are the same as those in the first exemplary embodiment, and thus, description thereof is omitted.

According to the present modification, dividing the collimator lens into first collimator lens 20A and second collimator lens 20B increases the number of parts but allows changing the shape of optically multiplexed beam emitted from diffraction grating 30.

Figure 6:
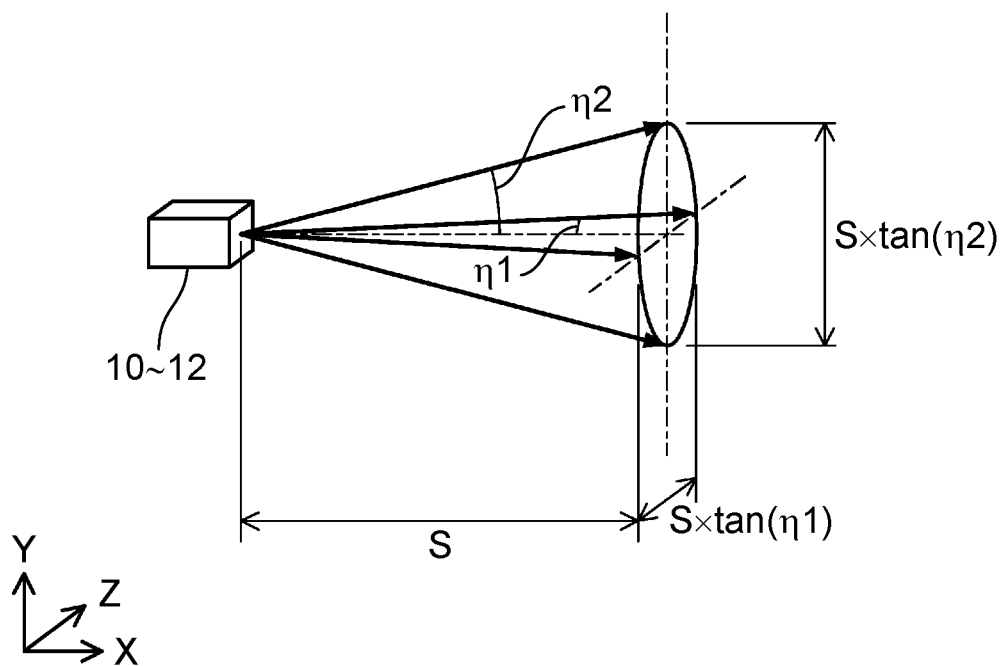
FIG. 6 is a view illustrating emission light from a light source.

As illustrated in FIG. 6, emitted laser beams from light sources 10, 11, 12 spread in an elliptical shape, and when η1 is a spread angle in a fast axis direction (Z axis direction), and η2 is a spread angle in a slow axis direction (Y axis direction), a ratio between the length in the fast axis direction and the length in the slow axis direction of the elliptical beam is tan(η1):tan(η2). When f1 is the focal length in the fast axis direction of first collimator lens 20A and f2 is the focal length in the slow axis direction of second collimator lens 20B, the shape of beam can be made circular by setting the ratio of the focal lengths to satisfy the formula tan(η1):tan(η2)=f2:f1.

Light sources 10, 11, 12 are arranged along the slow axis direction (Y axis direction), so that in collimation in the slow axis direction, aberration of the light from light source 10, which is incident on second collimator lens 20B to be on the axis of collimator lens 20B, is not likely to occur, but aberration of the laser beams from light source 11 and light source 12, which are incident on second collimator lens 20B to be off the axis of collimator lens 20B, is likely to be large.

Meanwhile, in the fast axis direction (Z axis direction), the laser beams from light sources 10, 11, 12 are incident on first collimator lens 20A to be on the axis of collimator lens 20A, so that aberration is not likely to occur.

Thus, by setting focal length f2 of second collimator lens 20B longer than focal length f1 of first collimator lens 20A, off-axis aberration of second collimator lens 20B can be reduced.

Second Modification of First Exemplary Embodiment

Figure 7:
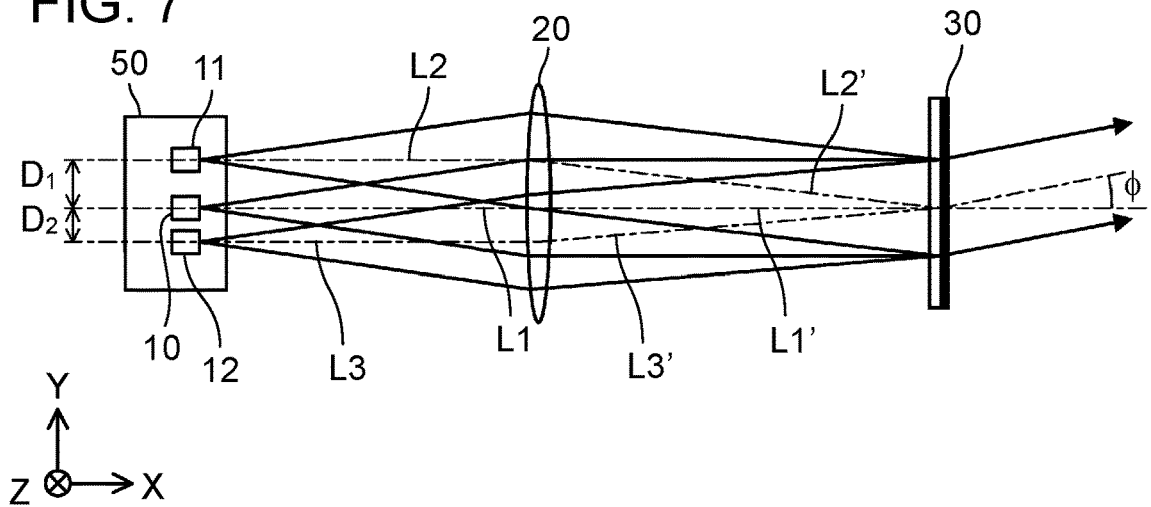
FIG. 7 is a view schematically illustrating a configuration of an optical multiplexer according to a second modification of the first exemplary embodiment.
Figure 8:
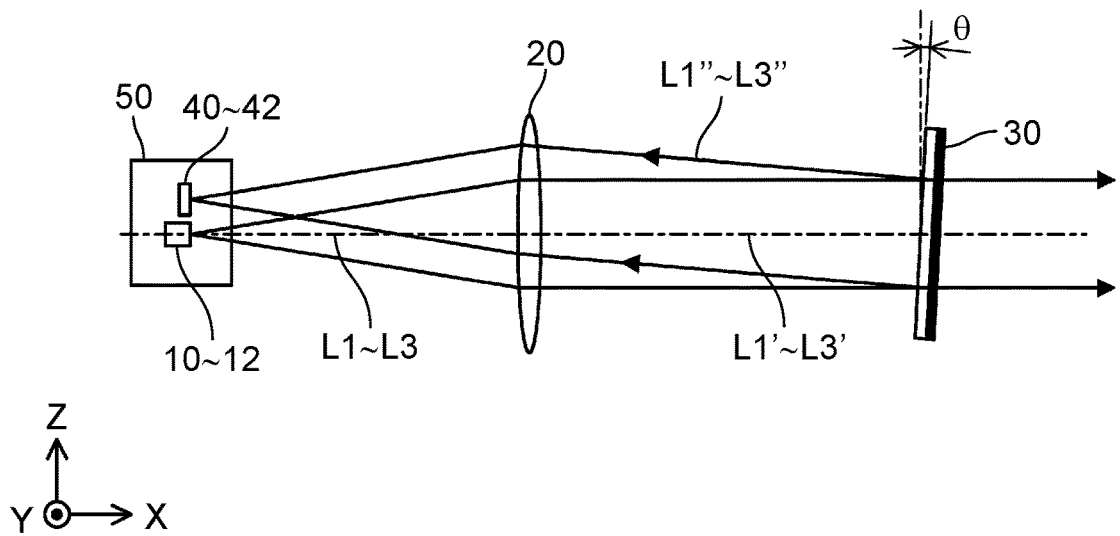
FIG. 8 is a view schematically illustrating the configuration of the optical multiplexer according to the second modification of the first exemplary embodiment.

FIGS. 7 and 8 are views schematically illustrating a configuration of an optical multiplexer according to a second modification of the first exemplary embodiment. FIG. 7 is a view of the optical multiplexer as viewed from the Z axis direction, and FIG. 8 is a view of the optical multiplexer as viewed from the Y axis direction. In FIGS. 7 and 8, the same component as that in FIG. 1 and FIG. 2 is denoted by the same reference mark, and description thereof will be omitted.

In the first exemplary embodiment, light receivers 40 to 42 are disposed behind light sources 10 to 12, that is, on the side to which laser beams are emitted in the negative direction of the X axis. The present modification is different from the first exemplary embodiment in that diffraction grating 30 is disposed so as to be inclined in a plane normal to the direction in which light sources 10 to 12 are arranged, and light receivers 40 to 42 are disposed at places where the reflected laser beams from diffraction grating 30 are condensed by collimator lens 20.

As illustrated in FIG. 8, light receivers 40 to 42 are disposed on the incident side focal plane of collimator lens 20 in the same manner as for light sources 10 to 12. Diffraction grating 30 is disposed so as to be inclined by angle θ in a plane normal to the direction in which light sources 10 to 12 are arranged, that is, in a plane normal to the slow axis (in a ZX plane). Thus, zeroth-order reflected laser beams L1" to L3" from diffraction grating 30 return toward light sources 10 to 12 at an angle of 2θ in the ZX plane.

Figure 9:
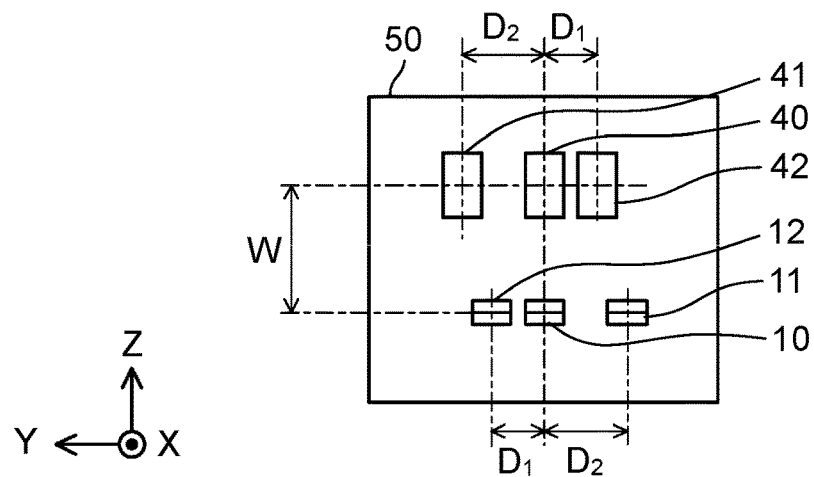
FIG. 9 is a view illustrating an arrangement of light receivers.

As illustrated in FIG. 9, when light receivers 40 to 42 are disposed at places separated from light sources 10 to 12 by a distance of W=f×tan(2θ) in the Z axis direction where f is the focal length of collimator lens 20, laser beams L1" to L3" reflected by diffraction grating 30 are condensed on light receivers 40 to 42 by collimator lens 20. Note that, since the order of laser beams L1 to L3 emitted from light sources 10 to 12 in the Y axis direction in XY plane is inverted by reflection by diffraction grating 30, the arrangement order of light receivers 40 to 42 in the Y axis direction is opposite to the arrangement order of light sources 10 to 12 in the Y axis direction.

It is preferable that light receivers 40 to 42 each have a length in the fast axis direction (Z axis direction) of light sources 10 to 12 wider than the length in the slow axis direction (Y axis direction) of light sources 10 to 12.

Semiconductor lasers as light sources 10 to 12 emit laser light not only forward but also rearward. In the first exemplary embodiment, light receivers 40 to 42 are disposed behind light sources 10 to 12 to detect the output of semiconductor lasers. When light sources 10 to 12 are arranged with shorter distances therebetween in the Y axis direction, laser beams from adjacent light sources enter light receivers 40 to 42 since the light from semiconductor laser spreads, and laser outputs are erroneously detected. Thus, a sufficient distance is necessary between adjacent ones among light sources 10 to 12, and this limits the degree of freedom of the size of the optical multiplexer.

According to the present modification, light receivers 40 to 42 are disposed so as not to receive light emitted rearward from light sources 10 to 12, that is, disposed at the same position in the X axis direction as light sources 10 to 12. Disposed in this manner, light receivers 40 to 42 receive zeroth-order reflected light from diffraction grating 30 and receive no unnecessary light emitted from adjacent light sources 10 to 12. Accordingly, distances between light sources 10 to 12 can be reduced, which allows downsizing of the optical multiplexer. Note that, the amount of zeroth-order reflected light from diffraction grating 30 is small compared to rearward emission light from light sources 10 to 12, so that the detected amount of light at light receivers 40 to 42 is small.

It is preferable that light receivers 40 to 42 have a length in the fast axis direction (Z axis direction) of light sources 10 to 12 wider than the length in the slow axis direction (Y axis direction) of light sources 10 to 12. Accordingly, even when the reflected light from diffraction grating 30 is positionally deviated due to an error in inclination angle θ of diffraction grating 30, the effect by the positional deviation can be kept small.

Second Exemplary Embodiment

Figure 10:
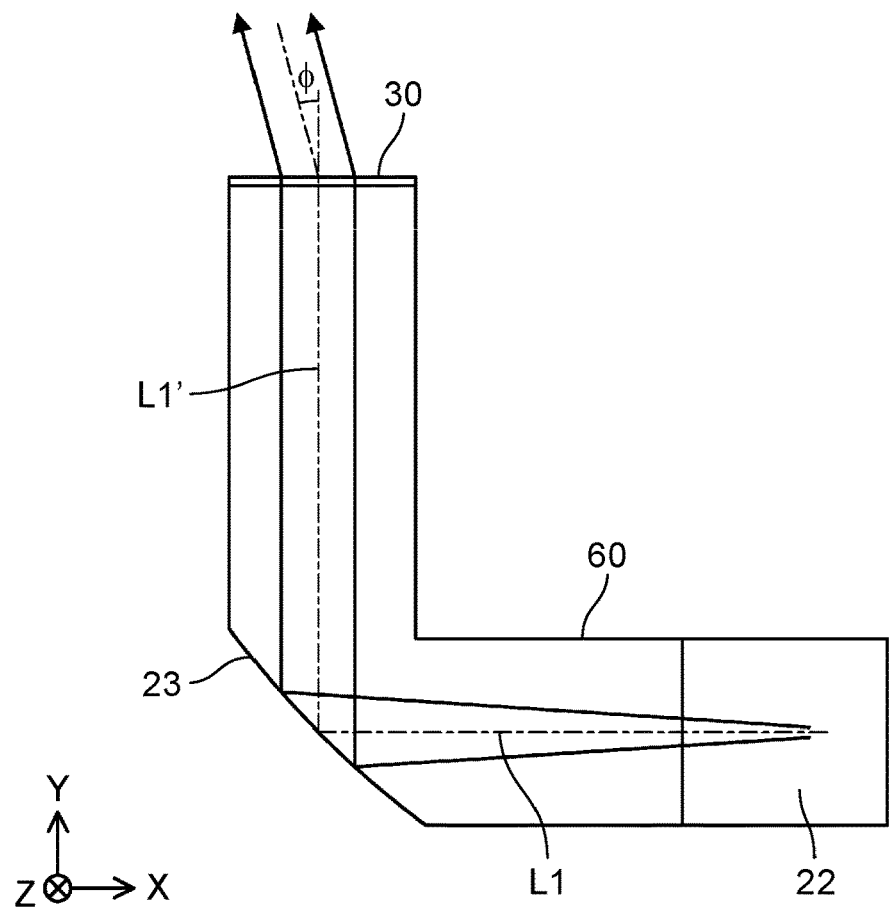
FIG. 10 is a view schematically illustrating a configuration of an optical multiplexer according to a second exemplary embodiment.
Figure 11:
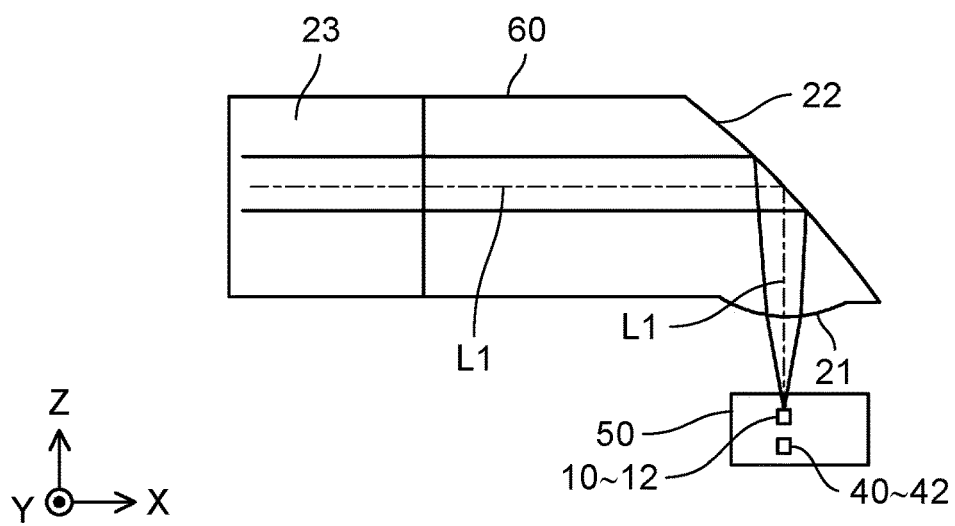
FIG. 11 is a view schematically illustrating the configuration of the optical multiplexer according to the second exemplary embodiment.
Figure 12:
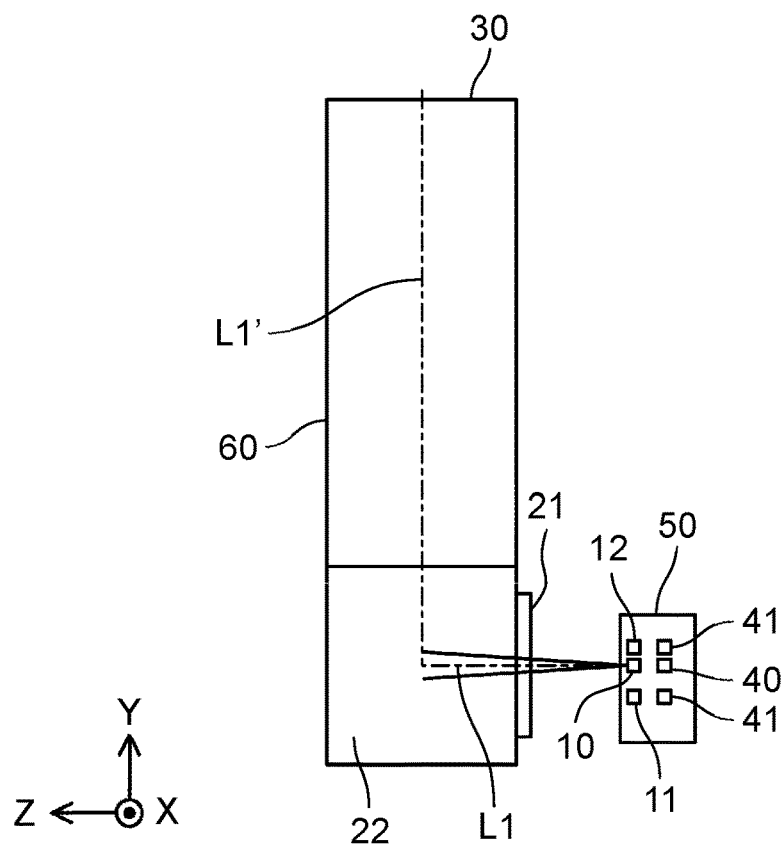
FIG. 12 is a view schematically illustrating the configuration of the optical multiplexer according to the second exemplary embodiment.
Figure 13:
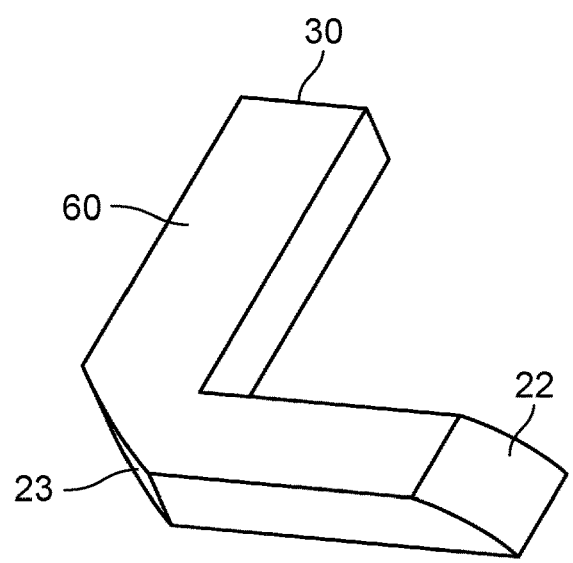
FIG. 13 is a view schematically illustrating the configuration of the optical multiplexer according to the second exemplary embodiment.

FIGS. 10 to 13 are views schematically illustrating a configuration of an optical multiplexer according to a second exemplary embodiment. FIG. 10 is a view of the optical multiplexer as viewed from the Z axis direction. FIG. 11 is a view of the optical multiplexer as viewed from the Y axis direction. FIG. 12 is a view of the optical multiplexer as viewed from the X axis direction. FIG. 13 is a perspective view of the optical multiplexer. In FIGS. 10 to 13, the same component as that in FIG. 1 and FIG. 2 is denoted by the same reference mark, and description thereof will be omitted.

In the first exemplary embodiment, transmissive collimator lens 20 is used as a collimator for collimating laser beams emitted from light sources 10 to 12, but the present exemplary embodiment is different in that a reflective concave reflecting mirror is used. In the first exemplary embodiment, collimator lens 20 and diffraction grating 30 are disposed in air, but the present exemplary embodiment is different in that the concave reflecting mirror (collimator) and diffraction grating 30 are integrated to be formed on surfaces of a transparent member.

As illustrated in FIGS. 10 to 13, an optical multiplexer (not including light sources 10 to 12) according to the present exemplary embodiment includes transparent member 60. For example, a resin such as PMMA and polycarbonate can be used as transparent member 60.

A partial surface of transparent member 60 indicated by reference mark 21 has a cylindrical shape having an axis parallel to the Y direction and forms an aspherical convex lens in an XZ cross section. A portion indicated by reference mark 22 has a cylindrical shape having an axis parallel to the Y axis and forms a first concave reflecting mirror forming a parabolic line in an XZ cross section. Lens 21 and first concave reflecting mirror 22 are disposed in combination such that an incident side focal plane thereof is on light sources 10 to 12.

A portion indicated by reference mark 23 has a cylindrical shape having an axis parallel to the Z axis and forms a second concave reflecting mirror forming a parabolic line in an XY cross section. Second concave reflecting mirror 23 is disposed such that an incident side focal plane thereof is on light sources 10 to 12 and an emission side focal plane thereof is on a grating surface of diffraction grating 30.

Since the arrangement of light sources 10, 11, 12 is the same as that of the first exemplary embodiment, the description thereof will be omitted.

In the present exemplary embodiment, laser beams L1 to L3 emitted from light sources 10 to 12 are condensed by lens 21, and reflected by first concave reflecting mirror 22 to be collimated laser beams. The laser beams reflected by first concave reflecting mirror 22 are reflected and collimated by second concave reflecting mirror 23 to be laser beams L1' to L3', and enter diffraction grating 30 to be diffracted and emitted along the same optical path. In FIGS. 10 to 13, only the optical path of laser light L1 emitted from light source 10 is illustrated.

According to the present exemplary embodiment, laser beams L1 to L3 emitted from light sources 10 to 12 are collimated and multiplexed by lens 21 and first and second concave reflecting mirrors 22, 23 formed on surfaces of transparent member 60, so that first and second concave reflecting mirrors (collimators) 22, 23 and diffraction grating 30 can be integrally formed. Accordingly, a further downsized optical multiplexer (not including light sources 10 to 12) can be provided at low cost.

Note that first 1 concave reflecting mirror 22 of the present exemplary embodiment serves as a first collimator that collimates laser light in the fast axis direction, and second 1 concave reflecting mirror 23 serves as a second collimator that collimates laser light in the slow axis direction. First and second concave reflecting mirrors 22, 23 are preferably total reflecting mirrors, but may be reflecting mirrors coated with a reflecting mirror film.

Lens 21 may have a flat surface or a concave lens surface. When a convex lens is given a smaller curvature to have a surface close to a concave surface, the wavefront aberration becomes smaller but leakage of light from first concave reflecting mirror 22 becomes larger. Note that, lens 21 may not be needed when laser beams emitted from light sources 10 to 12 can be well condensed.

First Modification of Second Exemplary Embodiment

Figure 14:
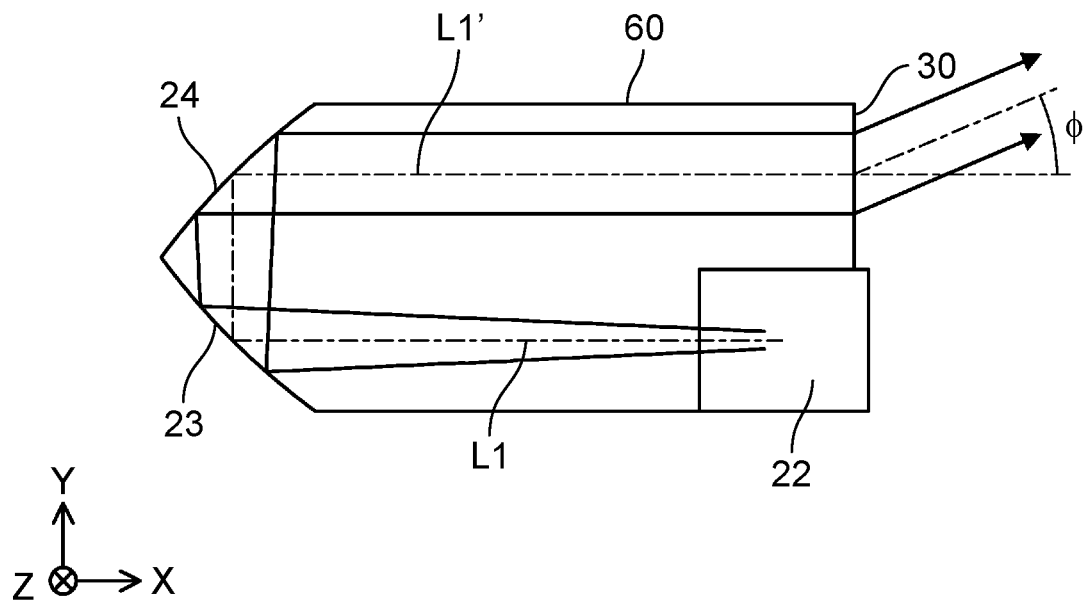
FIG. 14 is a view schematically illustrating a configuration of an optical multiplexer according to a first modification of the second exemplary embodiment.
Figure 15:
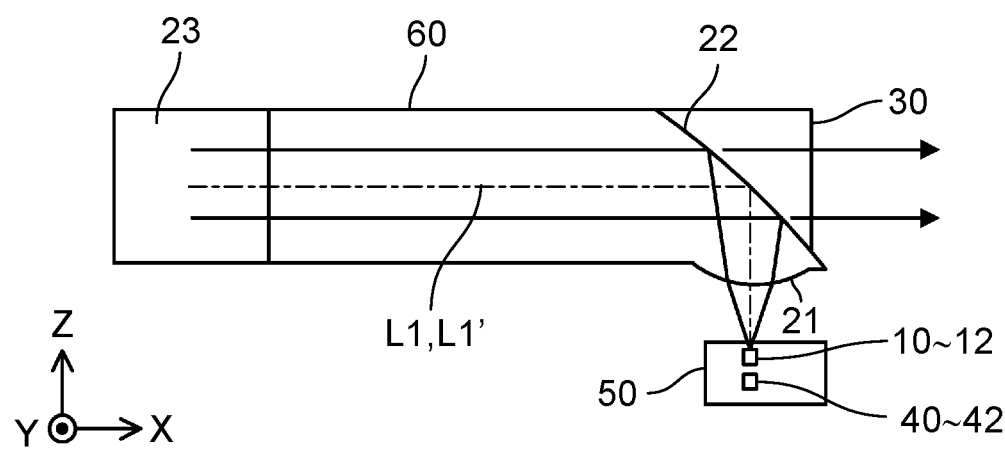
FIG. 15 is a view schematically illustrating the configuration of the optical multiplexer according to the first modification of the second exemplary embodiment.
Figure 16:
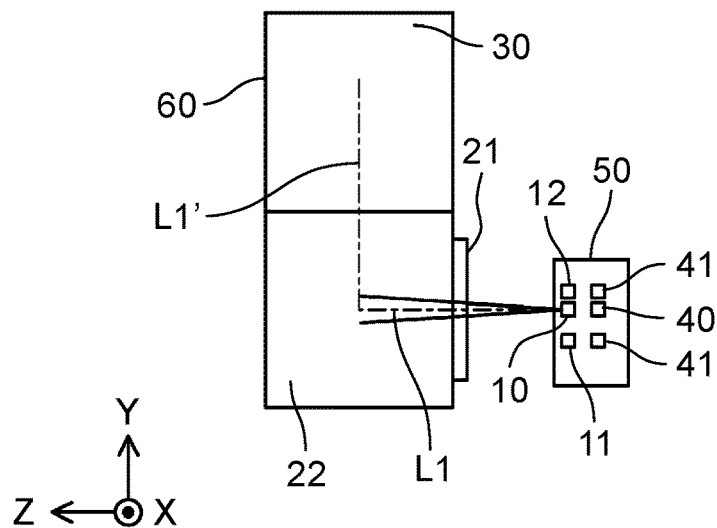
FIG. 16 is a view schematically illustrating the configuration of the optical multiplexer according to the first modification of the second exemplary embodiment.
Figure 17:
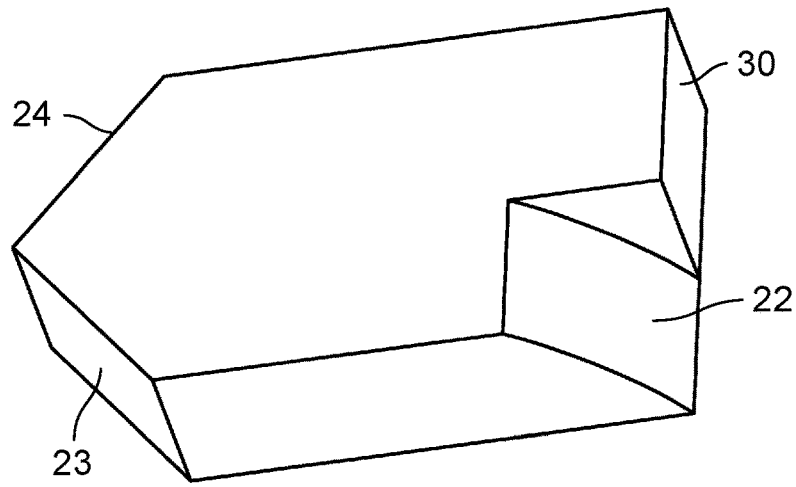
FIG. 17 is a view schematically illustrating the configuration of the optical multiplexer according to the first modification of the second exemplary embodiment.

FIGS. 14 to 17 are views schematically illustrating a configuration of an optical multiplexer according to a first modification of the second exemplary embodiment. FIG. 14 is a view of the optical multiplexer as viewed from the Z axis direction. FIG. 15 is a view of the optical multiplexer as viewed from the Y axis direction. FIG. 16 is a view of the optical multiplexer as viewed from the X axis direction. FIG. 17 is a perspective view of the optical multiplexer. In FIGS. 14 to 17, the same component as that in FIGS. 10 to 13 is denoted by the same reference mark, and description thereof will be omitted.

The present modification is different from the second exemplary embodiment in that second concave reflecting mirror (reflecting mirror for the slow axis direction) 23 in the second exemplary embodiment is divided into two reflecting mirrors.

As illustrated in FIGS. 14 to 17, partial surfaces of transparent member 60 indicated by reference marks 23, 24 form a second and a third concave reflecting mirrors each having a cylindrical shape having an axis parallel to the Z axis and forming a parabolic line in an XY cross section. Second and third concave reflecting mirrors 23, 24 have the same focal length and are disposed close to each other. Light sources 10 to 12 are disposed on an incident side focal plane determined by a combination of second and third concave reflecting mirrors 23, 24, and a grating surface of diffraction grating 30 is disposed on an emission side focal plane.

In the present modification, by using two concave reflecting mirrors 23, 24 to collimate a light in the slow axis direction, each reflecting mirror takes the half of converging angle of the laser light, and light wavefront aberration caused by the reflecting mirror can be greatly reduced by ¼. Furthermore, using two reflecting mirrors for the slow axis direction creates another turn of direction of laser light, and this allows further downsizing of the optical multiplexer (not including light sources 10 to 12).

Wavefront aberration in the slow direction takes a minimum value when focal lengths of concave reflecting mirror 23 and concave reflecting mirror 24 are the same. When worsening of wavefront aberration is not a problem, the focal lengths of concave reflecting mirror 23 and concave reflecting mirror 24 may be different.

Second Modification of Second Exemplary Embodiment

Figure 18:
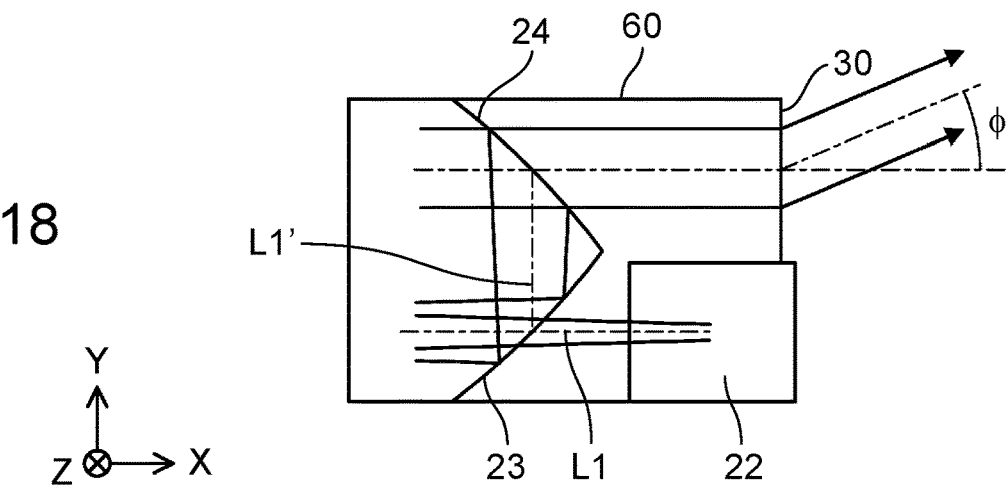
FIG. 18 is a view schematically illustrating a configuration of an optical multiplexer according to a second modification of the second exemplary embodiment.
Figure 19:
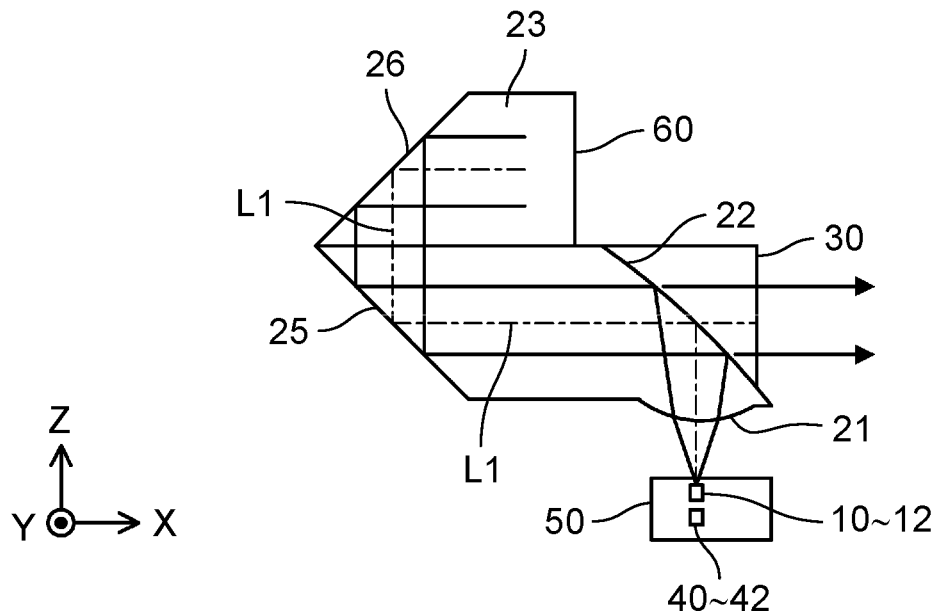
FIG. 19 is a view schematically illustrating the configuration of the optical multiplexer according to the second modification of the second exemplary embodiment.
Figure 20:
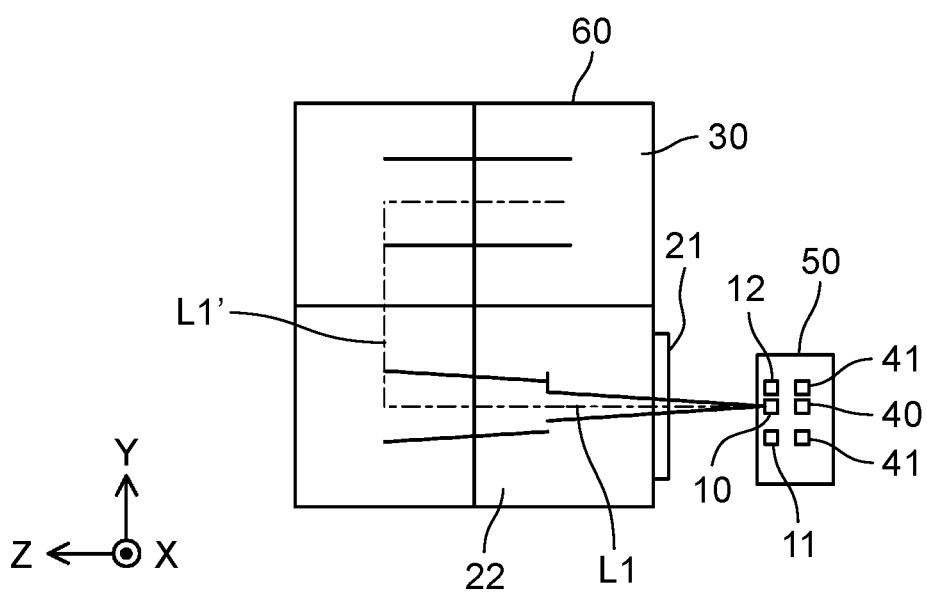
FIG. 20 is a view schematically illustrating the configuration of the optical multiplexer according to the second modification of the second exemplary embodiment.
Figure 21:
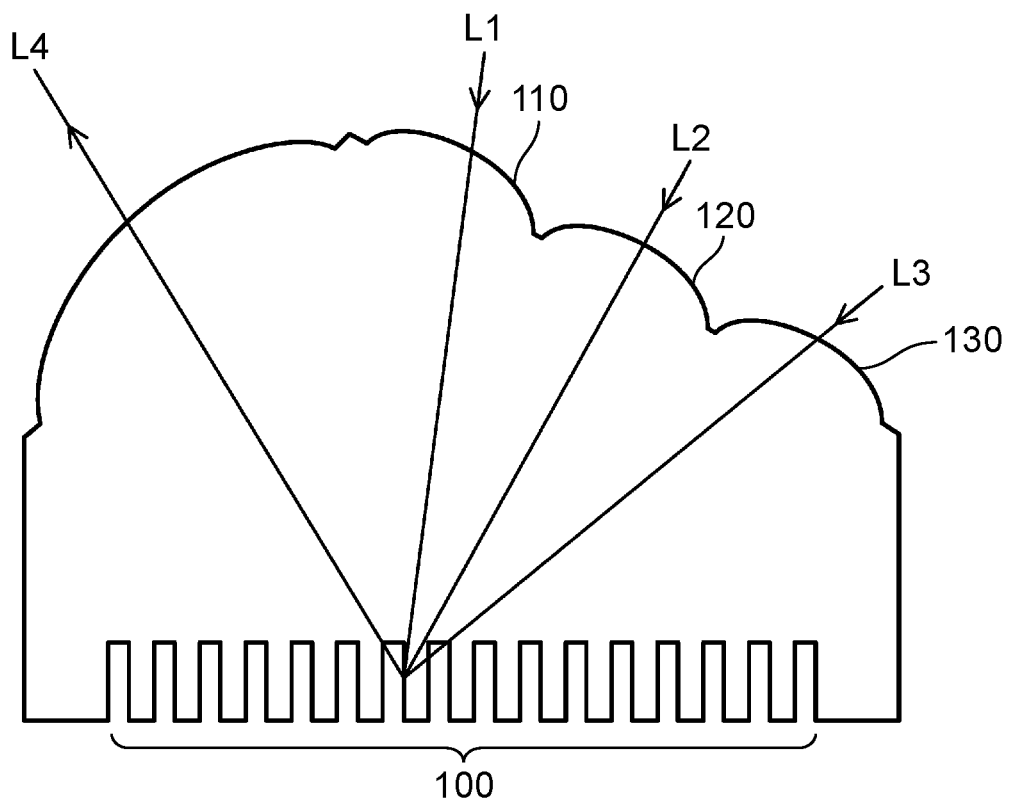
FIG. 21 is a view illustrating an optical multiplexer disclosed in PTL 1.

FIGS. 18 to 20 are views schematically illustrating a configuration of an optical multiplexer according to a second modification of the second exemplary embodiment. FIG. 18 is a view of the optical multiplexer as viewed from the Z axis direction. FIG. 19 is a view of the optical multiplexer as viewed from the Y axis direction. FIG. 20 is a view of the optical multiplexer as viewed from the X axis direction. In FIGS. 18 to 20, the same component as that in FIGS. 10 to 13 is denoted by the same reference mark, and description thereof will be omitted.

The present modification is different from the first modification of the second exemplary embodiment in that another turning system is added to the optical path in an XZ plane.

As illustrated in FIG. 19, a partial surface of transparent member 60 indicated by reference mark 25 is a first sloped surface, which is a plane inclined at −45° with respect to the X axis in an XZ plane. A portion indicated by reference mark 26 is a second sloped surface, which is a plane inclined at +45° with respect to the X axis in the XZ plane.

That is, first sloped surface 25 and second sloped surface 26 intersect at an angle of 90° in the XZ plane, and a laser light reflected by first concave reflecting mirror 22 to be directed from the positive side of the X axis to the negative side of the X axis is reflected by first and second sloped surfaces 24, 25 and turned to be along an optical path directed from the negative side of the X axis to the positive side of the X axis.

The laser light reflected by first and second sloped surfaces 24, 25 are collimated by second and third concave reflecting mirrors 23, 24, and the collimated laser beams enter diffraction grating 30 and are diffracted to be emitted along the same optical path.

In the present modification, the laser light reflected by first concave reflecting mirror 22 is reflected by first and second sloped surfaces 24, 25, so that the length in the X axis direction of the optical multiplexer (not including light sources 10 to 12) can be shortened without changing optical characteristics.

The inclination angles of first and second sloped surfaces 24, 25 are set to −45° and +45° with respect to the X axis, but may be set to +45° or more and −45° or less, although the length in the Z axis direction of the optical multiplexer will be larger. Setting the inclination angles to −45° or less and +45° or more is not preferable, because this cannot make total reflection and light will leak.

Although the present disclosure has been described with reference to preferable exemplary embodiments, the present disclosure is not limited to the above description, and various modifications can be made. For example, in the second exemplary embodiment and the first and second modifications thereof as described in the second modification of the first exemplary embodiment, diffraction grating 30 may be disposed to be inclined in a plane normal to the direction in which a plurality of light sources 10 to 12 are linearly arranged. In this case, light receivers 40 to 42 are disposed at places where reflected laser beams from diffraction grating 30 are condensed by first concave reflecting mirror (collimator) 22.

According to the present disclosure, an optical multiplexer having a high diffraction efficiency with small color shift, and with which an optical system including a light source can be downsized can be provided.

REFERENCE MARKS IN THE DRAWINGS 10 to 12: light source
20: collimator lens (collimator)
20A: first collimator lens
20B: second collimator lens
21: lens
22: first concave reflecting mirror (collimator)
23: second concave reflecting mirror (collimator)
24: third concave reflecting mirror (collimator)
25: first sloped surface
26: second sloped surface
30: diffraction grating
41, 42: light receiver
60: transparent member

The invention claimed is:

1. An optical multiplexer that multiplexes a plurality of laser beams having different wavelengths and emits a multiplexed laser light, the optical multiplexer comprising:
a plurality of light sources that emit a plurality of laser beams having different wavelengths;
a collimator that collimates the plurality of laser beams emitted from the plurality of light sources; and
a diffraction grating that diffracts the plurality of laser beams collimated by the collimator and emits the plurality of laser beams along a same optical path, the diffraction grating being of a transmission-type,
wherein the plurality of light sources are linearly arranged on an incident side focal plane of the collimator,
a grating surface of the diffraction grating is disposed on an emission side focal plane of the collimator,
a direction along which the plurality of light sources are arranged and a direction along which grooves of the diffraction grating extend are orthogonal to each other, and
a distance D between two adjacent light sources among the plurality of light sources is set to satisfy $D=f\times(\lambda_1-\lambda_2)/p$, where $\lambda_1$, $\lambda_2$ ($\lambda_1>\lambda_2$) are respectively wavelengths of laser beams emitted from the two adjacent light sources, f is a focal length of the collimator, and p is a pitch of the diffraction grating.

2. The optical multiplexer according to claim 1, wherein the plurality of light sources include three or more light sources, and are linearly arranged on the incident side focal plane of the collimator in an order of wavelength of three or more laser beams emitted from the three or more light sources.

3. The optical multiplexer according to claim 1, wherein the collimator includes a lens or a concave reflecting mirror.

4. The optical multiplexer according to claim 1, wherein each of the plurality of laser beams includes a fast axis component and a slow axis component,
the slow axis component of the each of the plurality of laser beams is parallel to a first direction, and
the plurality of light sources are linearly arranged in a direction parallel to the first direction.

5. The optical multiplexer according to claim 1, wherein each of the plurality of laser beams includes a fast axis component and a slow axis component,
the collimator includes a first collimator that collimates the fast axis component of the each of the plurality of laser beams and a second collimator that collimates the slow axis component of the each of the plurality of laser beams,
the plurality of light sources are disposed on an incident side focal plane of the first collimator and the second collimator, and
the grating surface of the diffraction grating is disposed on an emission side focal plane of the second collimator.

6. The optical multiplexer according to claim 1, wherein a plurality of light receivers that receive laser beams emitted from the plurality of light sources are disposed at places corresponding to places where the plurality of light sources are disposed.

7. The optical multiplexer according to claim 6, wherein the diffraction grating is disposed to be inclined in a plane normal to a direction in which the plurality of light sources are linearly arranged, and
the plurality of light receivers are disposed at places where a reflected light from the diffraction grating is condensed by the collimator.

* * * * *